United States Patent [19]

Mentink

[11] Patent Number: 5,682,807
[45] Date of Patent: Nov. 4, 1997

[54] HYDRAULIC CIRCUIT

[75] Inventor: Laurentius A. G. Mentink, Haaksbergen, Netherlands

[73] Assignee: Applied Power Inc., Butler, Wis.

[21] Appl. No.: 502,114

[22] Filed: Jul. 13, 1995

[30] Foreign Application Priority Data

Jul. 20, 1994 [NL] Netherlands ............... 9401191

[51] Int. Cl.$^6$ ............................ F15B 11/00; B60J 7/00
[52] U.S. Cl. ........................................ 91/530; 296/107
[58] Field of Search ..................... 91/525, 530; 296/107

[56] References Cited

U.S. PATENT DOCUMENTS

| | | | |
|---|---|---|---|
| 2,586,682 | 2/1952 | McLeod . | |
| 3,155,424 | 11/1964 | Bauer | 296/107 |
| 3,851,566 | 12/1974 | Herrmann | 91/414 |
| 3,910,045 | 10/1975 | Herrmann | 91/530 X |
| 4,793,468 | 12/1988 | Hamilton et al. | 91/530 X |
| 5,067,768 | 11/1991 | Fischbach | 296/107 |
| 5,110,175 | 5/1992 | Fischbach | 60/420 X |
| 5,279,119 | 1/1994 | Shelhart et al. . | |
| 5,335,926 | 8/1994 | Stolle . | |
| 5,375,418 | 12/1994 | Shellhart et al. | 91/420 X |
| 5,467,596 | 11/1995 | Yu | 91/468 X |

FOREIGN PATENT DOCUMENTS

| | | |
|---|---|---|
| 425 156 A3 | 5/1991 | European Pat. Off. . |
| 565 190 A1 | 10/1993 | European Pat. Off. . |
| 1153697 | 3/1958 | France ............... 91/530 |
| 1564040 | 3/1969 | France . |
| 2214054 | 12/1973 | France . |
| 2 035 779 | 1/1972 | Germany . |
| 38 26 788 | 2/1990 | Germany . |
| 38 26 789 | 2/1990 | Germany . |
| 9300474 | 3/1993 | Netherlands . |
| 9300624 | 4/1993 | Netherlands . |
| 483570 | 2/1970 | Switzerland . |
| 2 266 930 | 11/1993 | United Kingdom . |

*Primary Examiner*—Hoang Nguyen
*Attorney, Agent, or Firm*—Quarles & Brady

[57] ABSTRACT

The invention relates to a hydraulic circuit for the sequential control of two or more hydraulic cylinders and more particularly for opening and closing the folding roof a cabriolet type vehicle, in which the cylinder space under the piston of each piston cylinder device is selectively connectable to a hydraulic pressure source or to a reservoir for hydraulic fluid, and an additional valve device is provided by which the cylinder space above the piston is also connectable to the pressure source for at least some of the piston cylinder devices. The cylinder spaces above the pistons are hydraulically connected and the additional valve device is constituted by a common electrically operated valve for the piston cylinder devices, by which the cylinder spaces above the pistons are jointly connectable to either the pressure source or the reservoir.

2 Claims, 5 Drawing Sheets

HYDRAULIC CIRCUIT

BACKGROUND OF THE INVENTION

1. Field of the Invention

The invention relates to a hydraulic circuit for the sequential control of two or more hydraulic cylinders, and more particularly for opening and closing the folding roof of a vehicle of the cabriolet type, in which the cylinder space under the piston of each piston cylinder device is selectively connectable to a hydraulic pressure source or to a reservoir for hydraulic fluid, an additional valve device being provided, by means of which the cylinder space above the piston is also connectable to the pressure source for at least some of the piston cylinder devices.

The term "cylinder space under the piston" used hereinabove is to be interpreted as that part of the cylinder space which is positioned remote from the piston rod side, also referred to as the head end, whereas "cylinder space above the piston" is to be interpreted as the part of the cylinder space that is positioned on the piston rod side, also referred to as the rod end.

2. Discussion of the Prior Art

A circuit of the above described type is disclosed in EP-A-0 565 190. With this well-known circuit, the additional valve device comprises an electrically operated 3/2-valve for the cylinder space above the piston of each piston cylinder device, by means of which each of the cylinder spaces above the piston is independently connectable to either the pressure source or the reservoir. Each piston cylinder device is thus associated with two electrically controllable 3/2-valves. In use, this set of two valves is always controlled such that at each time only one of the valves is energized to connect the associated cylinder space to the pressure source, whereas the other of said two valves connects the associated cylinder space to the reservoir. With such a control one speaks of a "conventionally" controlled cylinder, which means that with the retraction as well as with the extension only one cylinder end is pressurized, while the other cylinder end is substantially pressureless.

In an application for opening and closing folding roofs with vehicles of the cabriolet type, an assembly of pairs of piston cylinder devices is involved, which have, due to the generally limited space that is available for installation, a small cylinder diameter and are operated under a relatively high pressure. The required electrically operated valves, which must be free of leakage under such high pressures, are expensive.

SUMMARY OF THE INVENTION

The invention aims at improving the well-known circuit, in the sense that fewer valves are required so that a circuit is obtained in which the risk of leaking valves is reduced, so that its operational safety is improved, while the costs of the circuit are correspondingly reduced.

According to the invention, this aim is achieved in that the cylinder spaces above the pistons, i.e., the rod ends of the cylinders, are hydraulically connected to a common electrically operated valve for the piston cylinder devices, by means of which the cylinder spaces above the pistons are jointly connectable to either the pressure source or the reservoir.

This means that with a circuit comprising three (pairs of) piston cylinder devices, four instead of six valves will be required, whereas an additional valve is saved for each additional (pair of) piston cylinder device(s). It will be understood that a smaller number of valves requires less space for installation and that the electric circuit comprising the electrical components of the valves is correspondingly more simple.

Moreover, with the hydraulic circuit according to the invention, all of the advantages connected with the well-known circuit discussed hereinabove are maintained, such as a holding function in the extension direction as well as in the retraction direction of each of the piston cylinder devices when, such as proposed in EP-A-0565190, 3/2 valves are used that are combined with an additional ball-check valve.

The invention will be hereinafter further described by way of example with reference to the drawings.

DETAILED DESCRIPTION OF THE PREFERRED EMBODIMENTS

Figure 1:
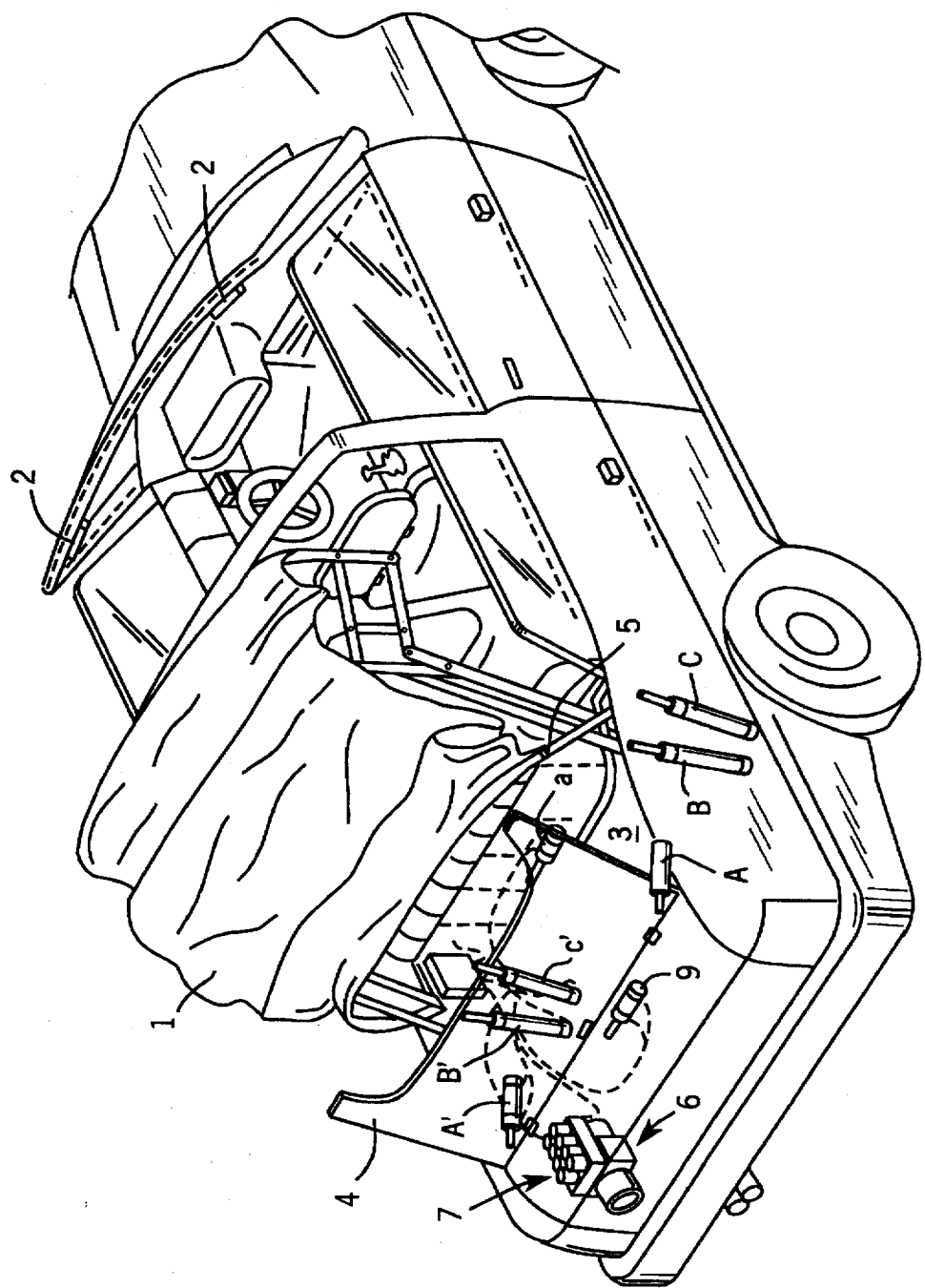
FIG. 1 shows a perspective view of a vehicle of the cabriolet type, the folding roof of which is shown in the partially opened position and wherein the (pairs of) hydraulic piston cylinder devices for operating the folding roof are illustrated.

In FIG. 1, 1 designates the folding roof, the front edge of which cooperates, in the closed position, with lock members indicated at 2, in a manner which is well-known and therefore not further explained.

In its completely folded position, the folding roof 1 is stored away in the storage space 3, which may be closed by means of a cover 4.

The folding roof 1 comprises a rear bow 5. In the completely closed roof position this bow is supported on the cover 4 that closes the empty storage room 3.

A piston cylinder device a and three pairs of hydraulic piston cylinder devices A—A', B—B' and C—C' are generally provided for the opening and closing of the roof. The piston cylinder devices of each pair operate in parallel and are each provided on a side of the vehicle. The piston cylinder device a is used for locking the cover 4, the pair A—A' is used for the opening and closure of the cover 4, the pair B—B' for moving the bow 5 and the pair C—C' for folding and stretching of the proper roof 1.

Furthermore, FIG. 1 shows a hydraulic power unit indicated at 6, whereas 7 indicates the control valves for the various piston cylinder devices, said valves being placed to form a compact unit.

Figure 2:
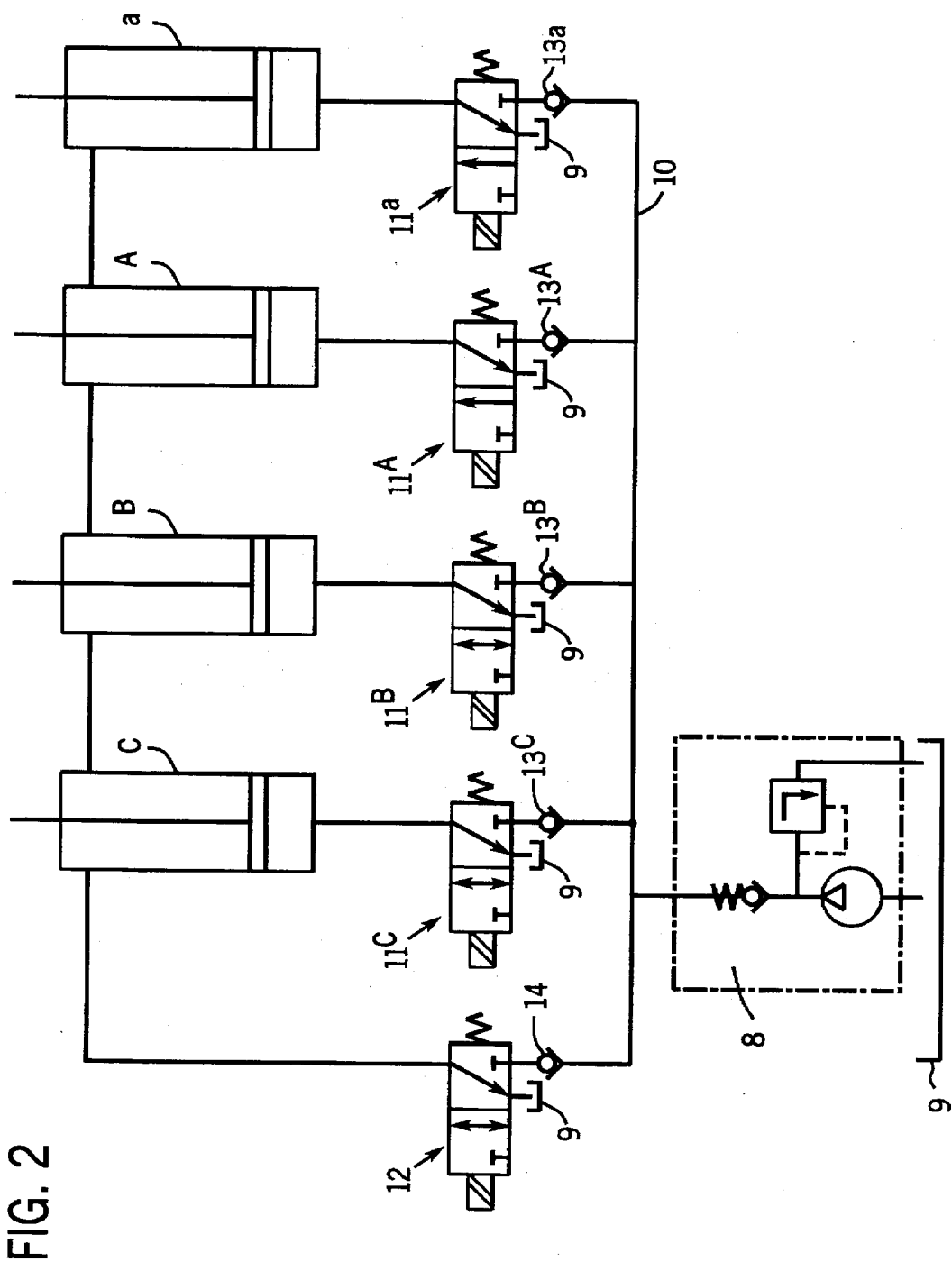
FIG. 2 shows a simplified hydraulic circuit according to the invention, comprising four hydraulic piston cylinder devices.

From the power source 6 shown in FIG. 1, the diagram of FIG. 2 shows the electric motor driven pump 8 and the reservoir 9 for hydraulic fluid. 10 indicates the pressure conduit of the pump.

The "spaces under the piston" of all of the four cylinders a, A, B and C are each separately connected to the pressure conduit 10 through an electric control valve 11a, 11A, 11B and 11C respectively. The "spaces above the piston" of the piston cylinder devices a, A, B and C are connected to one another and are connected to the pressure conduit through a common solenoid valve 12.

As may be seen in the diagram of FIG. 2, all of the said electrically operated valves are of the 3/2 type (three connecting gates and two positions) and each of these valves has in its connection to the pressure conduit 10 a ball-check valve 13a, 13A, 13B and 13C and 14 respectively. For a more detailed description of these valves, reference is made to EP-A-0565190.

Furthermore, the valves 11a, 11A, 11B, 11C and 12 are arranged, together with the electric drive motor for the pump 8, in an electric control circuit (not shown), adapted to determine—in the opening or closing procedure of the roof—in which sequence the various valves are to be energized and the associated piston cylinder devices a, A–C are to be operated.

Figure 3A:
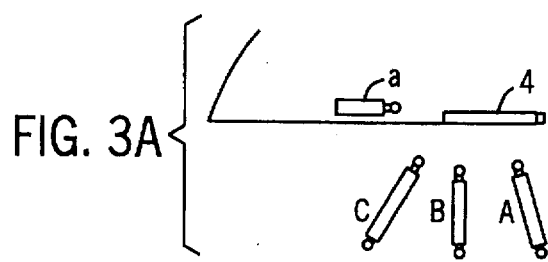
FIG. 3A–3G illustrate seven successive steps of the closing procedure with the folding roof of a vehicle of the type shown in FIG. 1 and FIG. 4A–4G illustrate in a diagrammatic manner the successive steps of the opening procedure of the folding roof.

In the diagram of FIG. 2 all of the piston cylinder devices a, A, B and C are in their fully retracted positions, and none of the five valves is energized, so that both cylinder ends of all of the four piston cylinder devices are connected to the reservoir 9. This situation corresponds to the roof 1 being stored in its folded position within the storage room 3, that is closed by the locked cover 4. In this situation, which is diagramically shown in FIG. 3A, the roof could be brought—by manual operation—into the closed position in case of an electric voltage breakdown.

With reference to FIGS. 3B–3G, it will now be explained how the roof may be brought in the closed position under electric control.

Figure 3B:
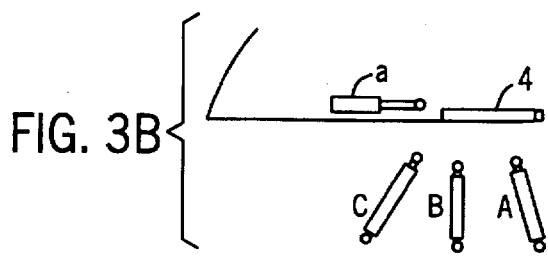

By depressing a switch "close roof" (not shown in the drawing) the hydraulic pump 8 is first put into operation and the valve 11a in the diagram of FIG. 2 is energized to cause the hydraulic cylinder a to extend and the cover 4 to be unlocked (see FIG. 3B). For unlocking of the cover 4, a pressure of e.g. 50 bar is required.

Figure 3C:
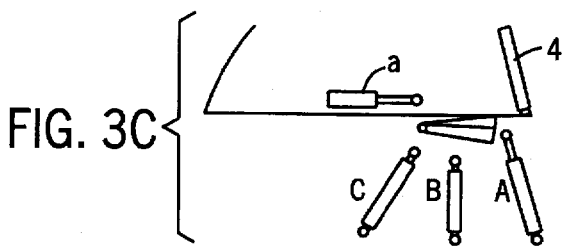
Figure 3D:
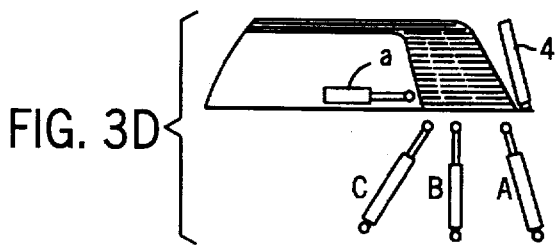
Figure 3E:
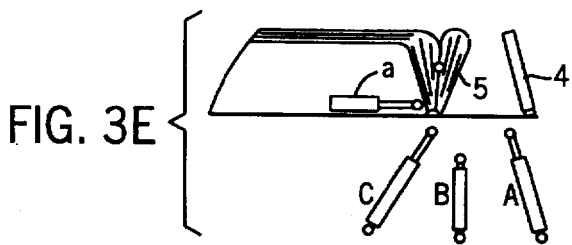
Figure 3F:
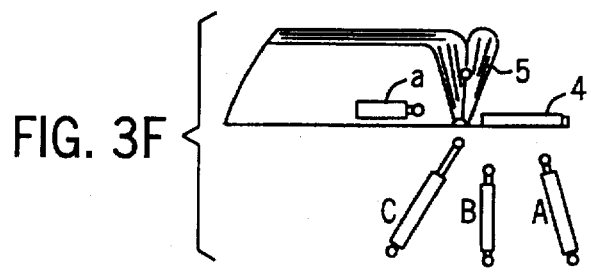

Thereupon, while the pump 8 keeps operating and the valve 11a is kept energized, the valve 11A is energized, as a result of which the hydraulic cylinder A extends to open the cover 4 (see FIG. 3C). To open the cover 4, a pressure of e.g. 50 bar is also required.

Thereafter, while the pump 12 continues operating and the valves 11a and 11A are kept energized, the valve 11C is energized to cause the hydraulic cylinder C to extend and have the roof 1 lifted from the storage space 3 and placed into the closed position. During this step the actuating cylinder B for the rear bow 5 is freely taken along by the roof structure (see FIG. 3D). Assuming the pressure required for this operation is 25 bar, due to the provision of the ball-check valves 13a and 13A in the pressure connections of the valves 11a and 11A, the pressure in the cylinders a and A is prevented from dropping to 25 bar, which would render the opened position of the cover 4 no longer secured. A wind blast might in such a situation press the cover from its opened position, while at the same moment the unfolding roof might be passing in the upward direction.

In the following phase—while the pump is still kept operating and the valves 11a, 11A and 11C remain energized, the valve 11B is energized to cause the cylinder B to (further) extend and to cause the bow 5 to lift the rear portion of the roof, including the rear wind screen. The latter step is required to enable the cover 4 to close again (see FIG. 3E). It is assumed that this operation requires a pressure of 100 bar. This pressure will also be supplied to the pressure side of the extended cylinders a, A and C.

While the pump continues operating, the energization of the valve 11A is interrupted and valve 12 is energized, while the valves 11a, 11B and 11C are kept energized. This causes the cylinder A to retract and thereby close the cover 4. It is assumed that this retracting movement involves a pressure of 10 bar. The same pressure will rule in the cylinder space above the piston with the cylinders a, B and C, so that the pistons in those cylinders will be "regeneratively" held in their extended positions. The cover has now arrived in the closed position shown in FIG. 3F. Thereupon, while the pump is still operating and the valves, 12, 11B and 11C remain energized, the energization of valve 11A is interrupted, as a result of which the cylinder A retracts and causes the closed cover 4 to be locked (see also FIG. 3F).

Figure 3G:
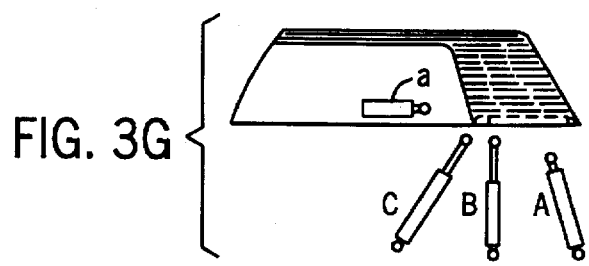

In the last phase of the closing procedure, while merely the valves 12 and 11C remain energized, the energization of valve 11B is interrupted, so that the cylinder B will retract and cause the rear bow 5 to move downwards, due to which the roof is closed on the rear side and stretched (see FIG. 3G). The pump is switched off and the state of energization of all of the valves 11 and 12 is interrupted as soon as the roof position shown in FIG. 3G is obtained. In that position the cylinders a, A and B are in the retracted positions, whereas the cylinder C is in its extended position and all valves are "open". The latter (open) position of the valves enables operation of the roof by hand and, more specifically, also in those cases in which an automatic operation is impossible, e.g., due to the electric power source being exhausted.

In case the pump stops in any intermediate stage of the above procedure, e.g., by release of the switch button, the valves may be energized or kept energized so that the various ball-check valves will hold the respective cylinders in their latest positions, in case the pumping pressure falls completely away.

Figure 4A:
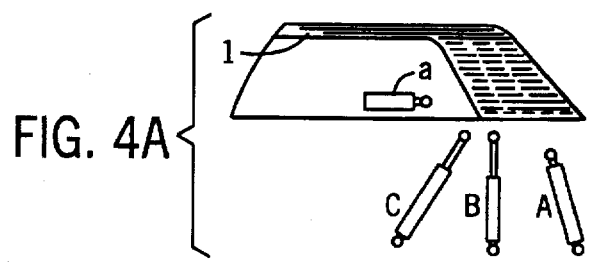
Figure 4B:
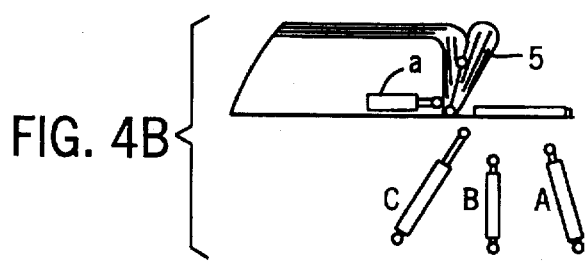
Figure 4C:
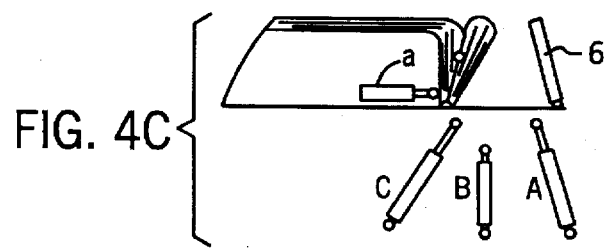
Figure 4D:
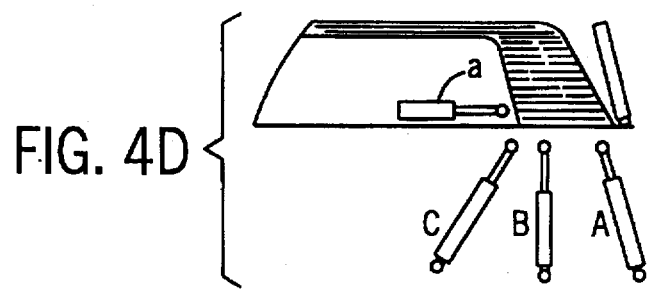
Figure 4E:
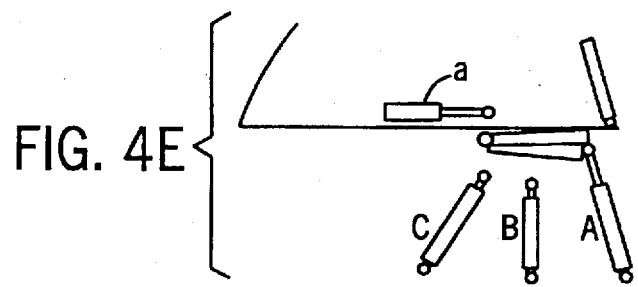
Figure 4F:
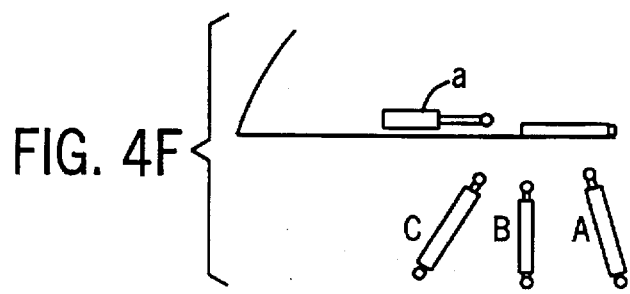
Figure 4G:
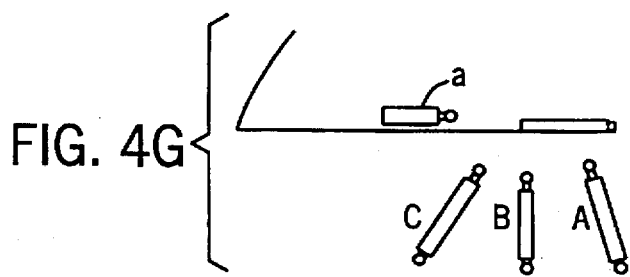

FIG. 4A–4G show the successive phases which are passed through when opening the roof from the closed position shown in FIG. 4A. After the above explanation with reference to FIG. 3A–3G, the FIGS. 4A–4G will be self-explanatory.

It will be understood that the desired sequence of energizations and de-energization of the various valves may be effected in a simple manner by a corresponding electric switching of the two limit switches associated with the cylinders.

I claim:

1. A convertible roof opening and closing system for an automotive vehicle, comprising:

a foldable convertible roof;

hydraulic cylinders for folding said roof open or closed, each said cylinder having a head end and a rod end;

head end valves, one for each said cylinder, for selectively connecting the head end of the corresponding cylinder to a pressure source or to a hydraulic reservoir; and a rod end valve which is common to said cylinders and hydraulically connected to each of the rod ends of said cylinders for selectively connecting said rod ends to said source or to said reservoir.

2. A system as claimed in claim 1, wherein said rod end valve is an electric 3/2 valve and a ball-check valve is provided in a pressure connection of said 3/2 valve.

* * * * *